(12) United States Patent
Komiya et al.

(10) Patent No.: US 7,030,900 B2
(45) Date of Patent: Apr. 18, 2006

(54) BEAM SCANNING APPARATUS AND IMAGE FORMING APPARATUS USING THE SAME

(75) Inventors: Kenichi Komiya, Kanagawa-ken (JP); Koji Tanimoto, Shizuoka-ken (JP); Daisuke Ishikawa, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/617,029

(22) Filed: Jul. 11, 2003

(65) Prior Publication Data

US 2005/0007443 A1    Jan. 13, 2005

(51) Int. Cl.
*B41J 2/47* (2006.01)

(52) U.S. Cl. ...................... 347/239; 347/255

(58) Field of Classification Search ............... 347/237, 347/239–240, 247, 132, 144–145, 251–255; 358/3.03, 3.24, 300
See application file for complete search history.

(56) References Cited

U.S. PATENT DOCUMENTS

| 4,837,636 | A | * | 6/1989 | Daniele et al. ............. 358/300 |
| 4,999,718 | A | * | 3/1991 | Arai ........................... 358/3.24 |
| 5,065,441 | A | * | 11/1991 | Yamamoto et al. ......... 382/276 |
| 5,148,287 | A | * | 9/1992 | Kemmochi et al. ........ 358/3.03 |
| 6,462,855 | B1 | | 10/2002 | Komiya et al. ............. 359/212 |

* cited by examiner

*Primary Examiner*—Hai Pham
(74) *Attorney, Agent, or Firm*—Foley & Lardner LLP

(57) ABSTRACT

A method and apparatus for scanning a common scan line in a main scanning direction with a light emitting device is provided. The method and apparatus preferably generates at least a first control signal and a second control signal for driving the light emitting device, the first control signal and the second control signal being generated from image data for the common scan line in the main scanning direction, drives the light emitting device with the first control signal to scan the common scan line in the main scanning direction, and drives the light emitting device with the second control signal to scan the common scan line in the main scanning direction.

16 Claims, 4 Drawing Sheets

BEAM SCANNING APPARATUS AND IMAGE FORMING APPARATUS USING THE SAME

BACKGROUND OF THE INVENTION

A. Field of the Invention

The present invention relates generally to image forming devices, and more particularly, to a beam scanning apparatus in an image forming device and a method of operating thereof.

B. Background of the Invention

Beam scanning apparatuses for image forming devices such as photocopiers, facsimile machines, and laser printers are known. An example of such a device is described in U.S. Pat. No. 6,462,855, which is incorporated by reference herein in its entirety.

In conventional high-speed image forming devices, a plurality lasers are used to scan an image surface on a line by line basis, where different lasers are used to "scan" successive lines. To accurately scan the image surface, a complex control system to precisely control the scanning position or an expensive laser array is required due to the presence of multiple lasers. Hence, a need exists for a beam scanning apparatus which reduces or eliminates the need for a complex control system and/or multiple lasers.

SUMMARY OF THE INVENTION

According to one embodiment of the present invention, a light beam scanning apparatus is provided, including a light beam generating unit configured to generate a light beam, at least two modulators configured to modulate the light beam, and at least one image processor configured to transfer the image data to the at least two modulators. The at least two modulators output a modulated signal including image data for a common scan line in a main scanning direction.

According to another embodiment of the present invention, a method of scanning a common scan line in a main scanning direction with a light emitting device is provided, including generating at least a first control signal and a second control signal for driving the light emitting device, driving the light emitting device with the first control signal to scan the common scan line in the main scanning direction, and driving the light emitting device with the second control signal to scan the common scan line in the main scanning direction. The first control signal and the second control signal are generated from image data for the common scan line in the main scanning direction.

According to another embodiment of the present invention, an image forming device is provided, including means for emitting a light beam, means for driving the means for emitting so as to scan a common scan line in a main scanning direction, and means for modulating the light beam with a plurality of modulated signals including image data for the common scan line in the main scanning direction.

Further features, aspects and advantages of the present invention will become apparent from the detailed description of preferred embodiments that follows, when considered together with the accompanying figures of drawing.

DETAILED DESCRIPTION OF PREFERRED EMBODIMENTS

Reference will now be made in detail to exemplary embodiments of the present invention. Wherever possible, the same reference numbers will be used throughout the drawings to refer to the same or like parts.

For purposes of explanation only, the following description will use the phrase "scan line" to refer to a series of pixels along a main scanning direction of an object to be scanned. In addition, the particular "scan line" being scanned at a given instance of time will be referred to as a "common scan line," where the next scan line to be scanned will be referred to as a "successive scan line" in reference to a sub-scanning direction. These phrases are to be interpreted broadly to at least encompass the aforementioned definitions, as would be readily apparent to one of ordinary skill in the art after reading this disclosure.

Figure 1:
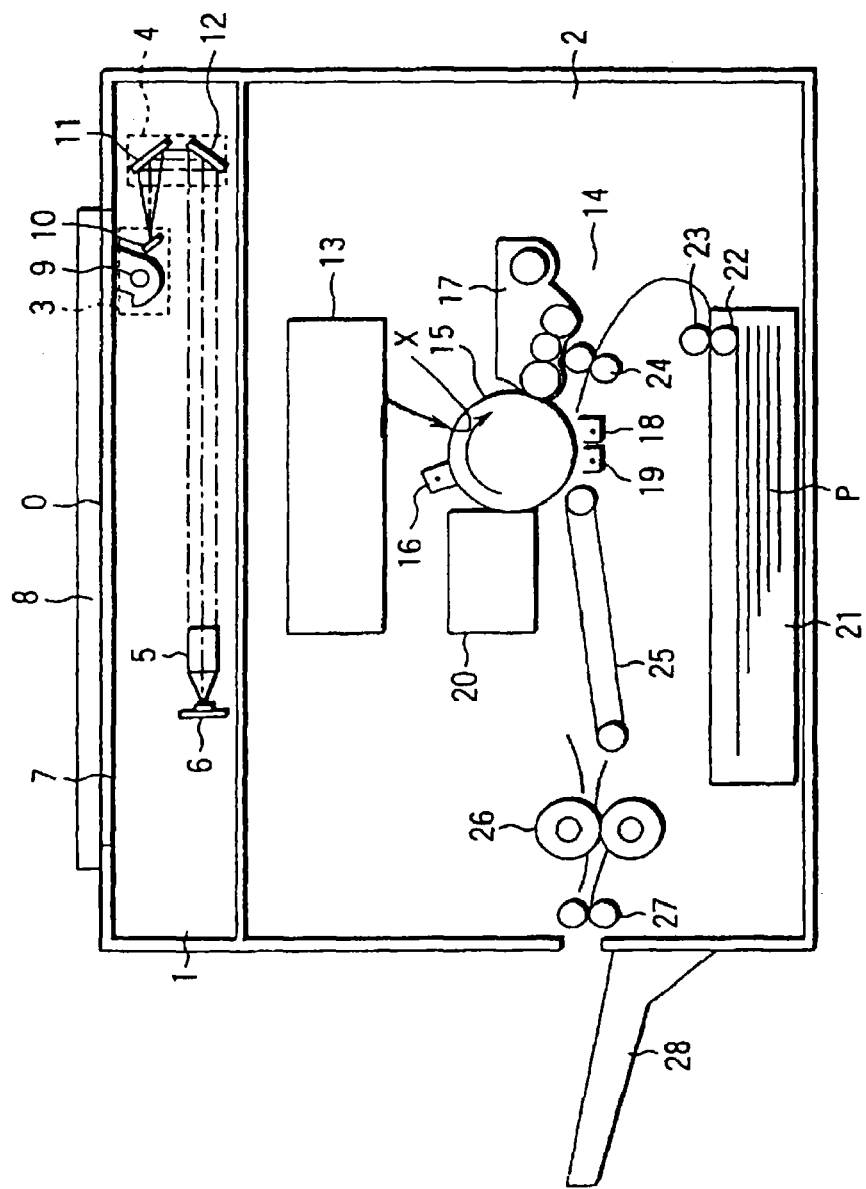
FIG. 1 schematically shows a structure of an image forming apparatus according to an embodiment of the present invention.

FIG. 1 schematically shows a structure of a digital copying machine used as an image forming apparatus to which a light beam scanning apparatus according to various embodiments of the present invention can be applied. The digital copying machine comprises a scanner section 1 serving as image reading means and a printer section 2 serving as image forming means. The scanner section 1 includes a first carriage 3 and a second carriage 4, both movable in a direction of an arrow, a focusing lens 5, and a photoelectric conversion element 6.

In FIG. 1, an original O is placed, with its face downward, on an original table 7 formed of transparent glass. The original O is held on the original table 7 by an openable original holding cover 8. The original O is illuminated by a light source 9. Reflection light from the original O is converged on a light-receiving surface of the photoelectric conversion element 6 via mirrors 10, 11 and 12 and the focusing lens 5. The first carriage 3 having the light source 9 and mirror 10 and the second carriage 4 having the mirrors 11 and 12 are moved at a relative speed of 2:1 so that the optical path length may always be constant. The first carriage 3 and second carriage 4 are moved from the right to the left by a carriage drive motor (not shown) in synchronism with a read timing signal.

An image on the original O placed on the original table 7 is successively read line by line by the scanner section 1. A read output is converted to an 8-bit digital image signal representing image density in an image process section (not shown).

The printer section 2 comprises an image forming section 14 wherein an optical system unit 13 is combined with an electrophotographic system capable of forming an image on a paper sheet P, or an image formation medium. Specifically, an image signal read from the original O by the scanner section 1 is processed by the image process section (not shown) and then converted to a laser light beam (hereinafter referred to merely as "light beam") to be emitted from a semiconductor laser. The image forming apparatus according to various embodiments of the present invention preferably adopts a single-beam optical system using a single semiconductor laser.

The semiconductor laser provided in the optical system unit 13 is driven according to laser modulation signals output from the image process section (not shown), thus emitting a light beam. The light beam is reflected by a polygon mirror and emitted out of the unit as a scan beam.

The light beam emitted from the optical system unit 13 is focused, as spot light having a required resolution, at an exposure location X on a photosensitive drum 15 serving as an image carrying body, and the light beam scans the surface of the photosensitive drum 15 in a main scan direction (i.e. in a direction of a rotational axis of the photosensitive drum). The photosensitive drum 15 is rotated and an electrostatic latent image corresponding to the image signal is formed on the photosensitive drum 15.

Around the photosensitive drum 15, there are provided a charger 16 for charging the surface of the drum 15, a developer unit 17, a transfer charger 18, a separator charger 19 and a cleaner 20. The photosensitive drum 15 is rotated by a drive motor (not shown) at a predetermined circumferential speed and is charged by the charger 16 disposed to face the surface of the drum 15. The light beam arranged in a sub-scan direction (i.e. a direction of movement of the photosensitive drum surface) is spot-focused at the exposure location X on the charged photosensitive drum 15.

The electrostatic latent image formed on the photosensitive drum 15 is developed into a toner image with a toner (developer agent) supplied from the developer unit 17. The toner image formed on the photosensitive drum 15 is transferred by the transfer charger 18 onto a paper sheet P fed from a paper feed system with a predetermined timing.

The paper feed system feeds paper sheets P, which are contained in a paper feed cassette 21 provided at the bottom of the apparatus, one by one separately by means of a feed roller 22 and a separation roller 23. The paper sheet P coming out of the paper feed cassette 21 is fed to register rollers 24 and then to a transfer position at a predetermined timing. On the downstream side of the transfer charger 18, there are provided a sheet convey mechanism 25, a fixing unit 26, and output rollers 27 for outputting paper sheets P with images. Accordingly, the paper sheet P on which the toner image has been transferred is conveyed to the fixing unit 26 and the toner image is fixed by the fixing unit 26. The resultant paper sheet P is delivered onto a sheet output tray 28 via the output rollers 27.

The toner remaining on the surface of the photosensitive drum 15, from which the toner image has been transferred onto the paper sheet P, is removed by the cleaner 20, and the photosensitive drum 15 is restored to its original state and made ready to be used again for image formation.

By repeating the above process, the image formation operation is successively performed.

As has been described above, the original O placed on the original table 7 is read by the scanner section 1, and the read information is subjected to a series of processes in the printer section 2 and then recorded on the paper sheet P as the toner image.

Figure 2:
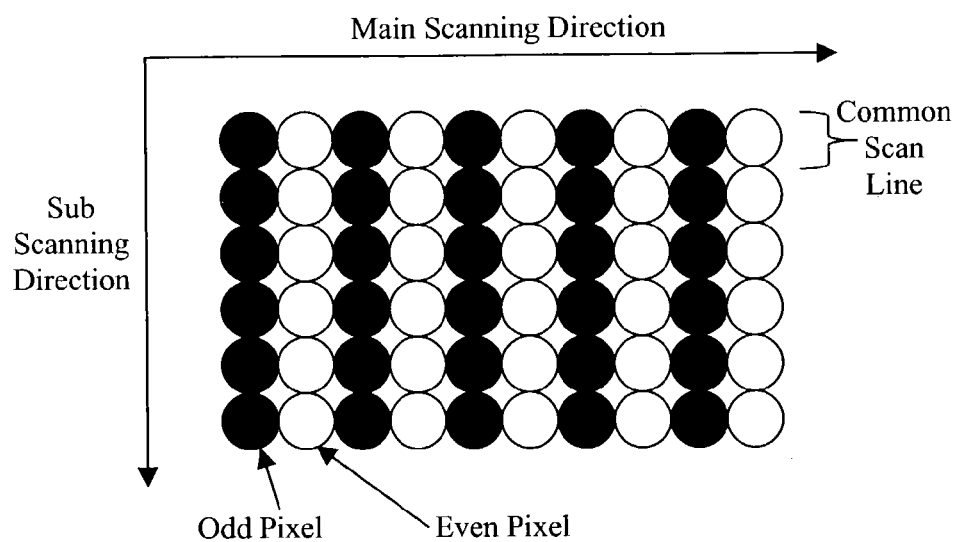
FIG. 2 is a diagram of a surface scanned by a beam scanning apparatus according to an embodiment of the present invention.

FIG. 2 shows a beam scanning technique according to one embodiment of the present invention. For purposes of illustration only, the depicted beam scanning technique is a dual modulation technique, where a light emitting device (e.g., a laser) is driven with a first control signal and a second control signal to form the plurality of odd and even pixels on a common scan line. The first control signal is used to generate the "odd pixels", represented by black circles, and the second control signal is used to generate the "even pixels", represented by white circles. It should be appreciated that a modulation technique including more than two control signals is also plausible as would be readily apparent to one of ordinary skill in the art after reading this disclosure.

The beam scanning technique of FIG. 2 operates in the following manner. To scan an object surface (e.g., a photosensitive drum on a laser printer), an image processor (not shown) generates a first control signal and a second control signal from image data received from an image data source (e.g., a computer). The beam scanning apparatus is then controlled to: (1) scan a common scan line using both the first control signal and the second control signal; (2) advance to the successive scan line; and (3) scan the successive scan line using the first control signal and the second control signal. This process is repeated as required to scan the entire object surface.

By using a plurality of control signals to scan the common scan line, the imaging speed can be increased through parallel processing of the plurality of control signals. More specifically, at least one limitation on the highest possible scanning speed is the processing speed of the image data being scanned, because the image surface cannot be scanned until the image data is processed. As each of the plurality of control signals can be processed separately and preferably simultaneously with the present embodiment, the maximum processing speed can also be increased. Thus, the present invention can be used with high-speed image formation devices, such as commercial laser printers and photocopiers.

Additionally, as noted above, the present invention can be used with more than two control signals to further increase the maximum processing speed; i.e., the processing speed can be increased through parallel processing of more than two control signals (e.g., three, four, five, etc.). However, the image formation speed may be limited by other factors in addition to the image processing speed, such as the speed at which a light beam can advance from one pixel to a next pixel within a common scan line. Thus, the number of control signals used may vary from one application to another.

Figure 3A:
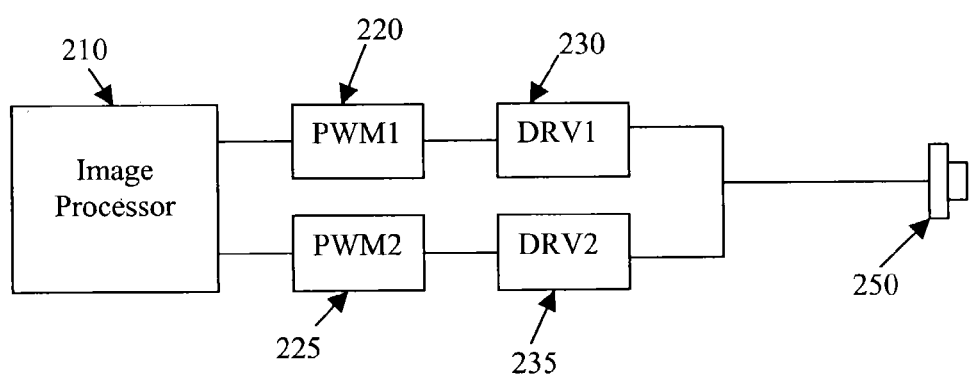
FIG. 3A is a block diagram of a beam scanning apparatus according to an embodiment of the present invention.
Figure 3B:
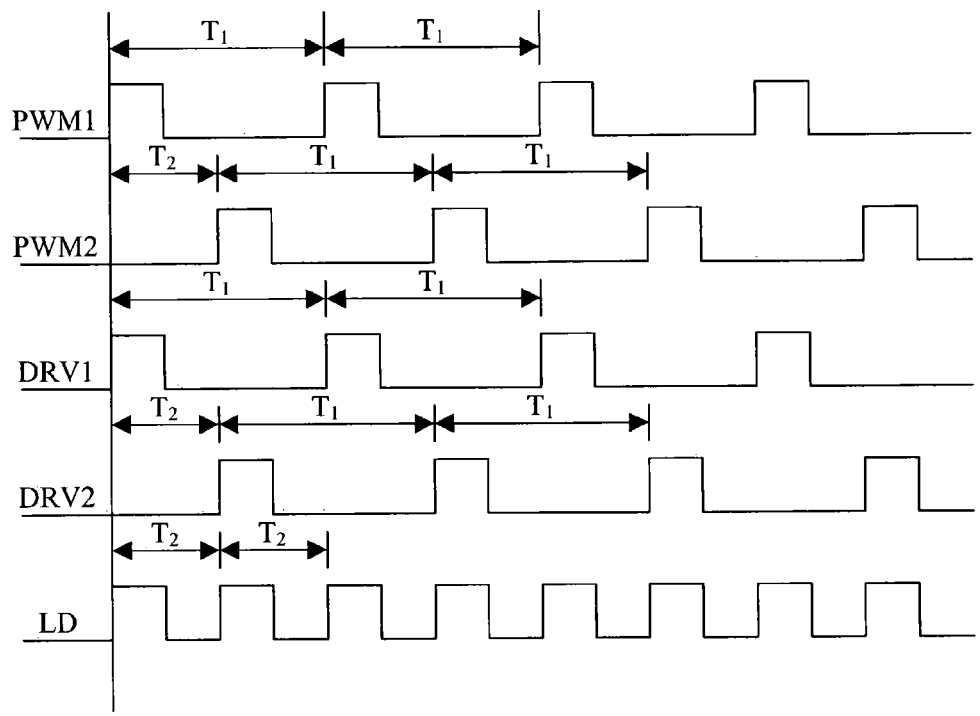
FIG. 3B is a timing diagram for the beam scanning apparatus of FIG. 3A.

The block diagram of FIG. 3A and the timing chart of FIG. 3B illustrate a beam scanning apparatus for use with the beam scanning technique of FIG. 2, according to another embodiment of the present invention. The beam scanning apparatus according to this embodiment includes an image processor 210 for generating a first control signal and a second control signal from image data, a first pulse width modulator (PWM) 220 for modulating the first control signal, a first laser driver (DRV) 230 for generating a first laser driver signal from the first modulated control signal, a second PWM 225 for modulating the second control signal, a second laser DRV 235 for generating a second laser driver signal from the second modulated control signal, and a laser 250 (or other type of light beam generating unit) driven by the first laser driver signal and the second laser driver signal. The first PWM 220 is configured to output a modulated control signal for odd pixel image data, and the second PWM 225 is configured to output a modulated control signal for even pixel image data.

The timing of the beam scanning apparatus is depicted in FIG. 3B. More specifically, the timing chart of FIG. 3B shows the output signal from each of the PWM 220 (i.e., PWM1), the PWM 225 (i.e., PWM2), the DRV 230 (i.e., DRV1), the DRV 235 (i.e., DRV2), and the light beam outputted by laser 250 (i.e., LD). The pixel clock cycle $T_1$ represents the time between successive pixels of the same modulation. For the dual modulation technique of FIG. 2, $T_1$ represents the time between successive odd pixels, as well as the time between successive even pixels. Time $T_2$ represents the time delay between adjacent pixels, and equals the pixel clock cycle $T_1$ divided by the number of control signals. Thus, for the dual modulation technique of FIG. 2, $T_2 = \frac{1}{2} T_1$, which is the time between an odd pixel and an adjacent even pixel.

It should be appreciated that delayed clock (for $T_2$) may be delayed from the pixel clock (for $T_1$) by means of a delay circuit or the like. In this regard, if more than two modulators are used, the pixel clock may be divided by the number of modulators, and delayed an appropriate time for each modulator. By way of example, if eight modulators are used, then the time delay between adjacent pixels is $\frac{1}{8} T_1$. A first pixel is synchronized with the pixel clock (for $T_1$), and each subsequent pixel is synchronized with a delayed clock (delayed by $\frac{1}{8} T_1$ per pixel), the process repeating after eight pixels. An appropriate delay circuit can thus be designed and implemented based on the number of modulators used.

As shown, the PWM 220 outputs the first modulated control signal PWM1, which is synchronized with the reference pixel clock cycle $T_1$. PWM1 is then used by the DRV 230 to generate the first laser driver signal DRV1, which is also synchronized with the reference pixel clock cycle $T_1$. Similarly, the PWM 225 outputs the second modulated control signal PWM2, which is synchronized with a delayed clock by time $T_2$. The PWM2 is then used by the DRV 235 to generate the second laser driver signal DRV2, which is also synchronized with a delayed clock by time $T_2$. The first laser driver signal DRV1 and the second laser driver signal DRV2 both drive the laser 250, which then outputs the light beam LD.

As described above, the first control signal and the second control signal control the light beam LD to scan along a common scan line. In this manner a single laser can be used, eliminating the need for a complex control circuit or expensive multi-laser array. Hence, it is possible for parallel processing to be used in the present embodiment to increase the processing speed, without incurring the cost of a complex control circuit or expensive multi-laser array.

It should be appreciated that, while only a dual modulation technique is depicted in FIGS. 3A and 3B, a modulation technique using more than two modulated control signals may be used. By way of example, if a modulation technique with "n" control signals were used (n being an integer greater than zero), the image processor 210 may output n control signals, which are modulated by n PWMs, and used by n DRVs to create n laser driver signals. These n laser driver signals can then be used to drive laser 250. Thus, the present invention may also be used with modulation techniques of an order higher than two.

Figure 4A:
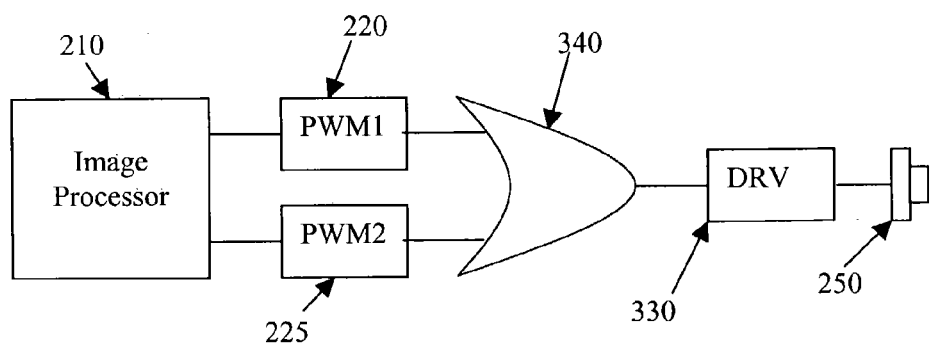
FIG. 4A is a block diagram of a beam scanning apparatus according to an embodiment of the present invention.
Figure 4B:
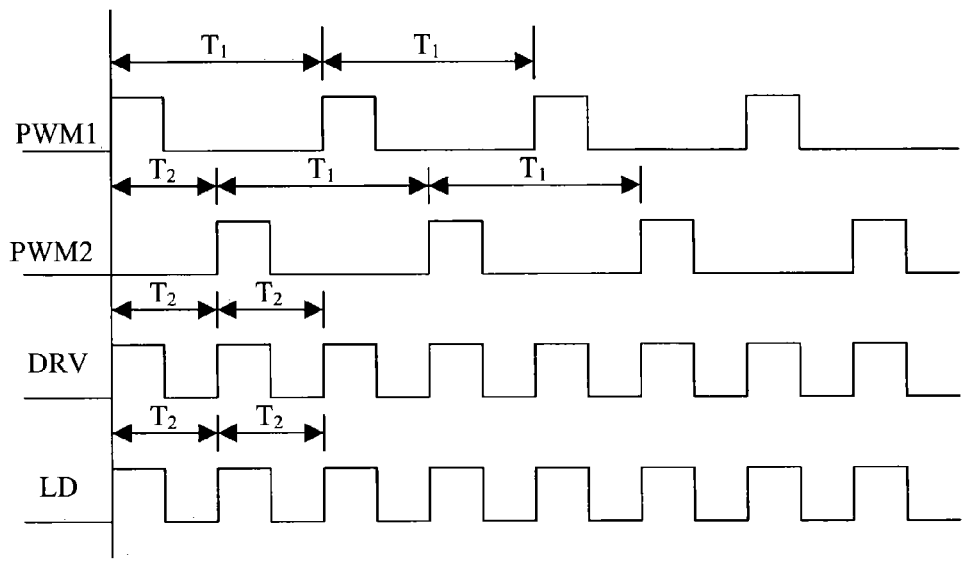
FIG. 4B is a timing diagram for the beam scanning apparatus of FIG. 4A.

The block diagram of FIG. 4A and the timing chart of FIG. 4B show a beam scanning apparatus for use with the beam scanning technique of FIG. 2 according to yet another embodiment of the present invention. Unlike the beam scanning apparatus of FIGS. 3A and 3B, the beam scanning apparatus of FIG. 4A includes a combiner 340 (e.g., an "OR" gate) coupled to the first PWM 220 and the second PWM 225, the combiner 340 outputting a combined modulated control signal from the first modulated control signal and the second modulated control signal. The combiner 340, in turn, is coupled to a single DRV 330, which is configured to generate a laser driver signal for driving laser 250 from the combined modulated control signal. In this manner, it is possible to replace either DRV 230 or DRV 235 with the combiner 340, which reduces the cost of the beam scanning apparatus.

As shown in FIG. 4B, the beam scanning apparatus of the present embodiment operates in a manner similar to that of FIG. 3B. Instead of two laser driver signals, however, the combiner 340 outputs the single laser driver signal DRV used to drive the laser 250. The use of the combiner 340 eliminates the need for both DRV 230 and DRV 235 of FIG. 2A, and further reduces the cost of beam scanning apparatus.

It should be appreciated that, while only a dual modulation technique is depicted in FIGS. 4A and 4B, a modulation technique using more than two modulated control signals may also be used. By way of example, if a modulation technique with "n" control signals were used (n being an integer greater than zero), the image processor 210 may output n control signals, which are modulated by n PWMs, and combined by the combiner 340 into a combined modulated control signal. This combined modulated control signal can then be used by DRV 330 to create a laser driver signal used to drive laser 250. Thus, the present invention may also be used with modulation techniques of an order higher than two.

Figure 5:
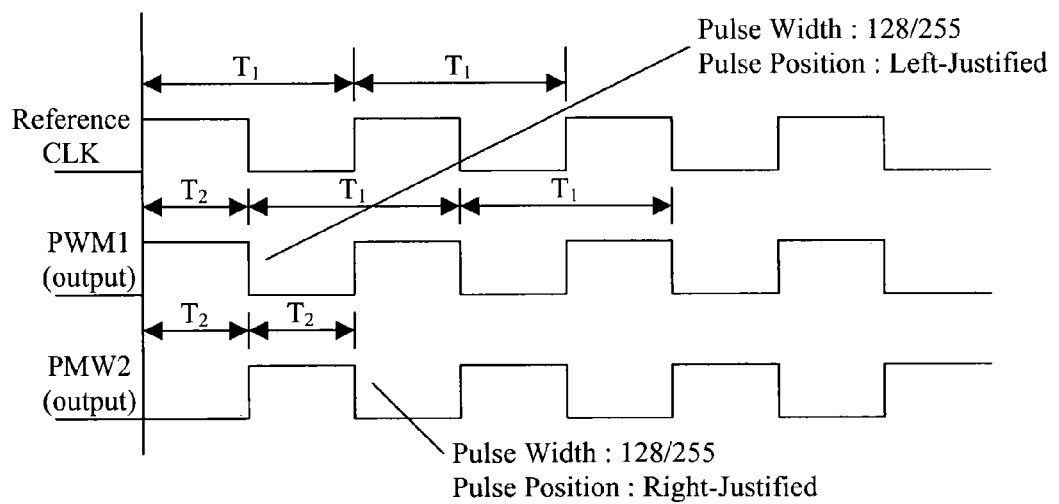
FIG. 5 is a timing diagram for the beam scanning apparatus of FIG. 3A or FIG. 4A.

Additionally, according to another embodiment of the present invention as shown in FIG. 5, the first PWM 220 and the second PWM 225 may include functionality to change a pulse position of their respective modulated signal outputs. Thus, the first PWM 220 and the second PWM 225 may both be synchronized with the reference clock, where one of the first PWM 220 and the second PWM 225 is controlled so as to change the pulse position of PWM1 or PWM2 respectively. By way of example, PWM1 is shown left-justified and PWM2 is shown right-justified in FIG. 5, where second PWM 225 is controlled to change a pulse position of PWM2 relative to the reference clock signal. In this manner, a plurality of PWMs can be synchronized to the same reference clock, providing simpler control thereof over conventional systems, while still allowing for delays to be created between various PWM outputs.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A light beam scanning apparatus, comprising:
    an image processor configured to generate a plurality of control signals from image data so as to form a series of pixels along a common scan line;
    a plurality of modulators configured to modulate said plurality of control signals for said series of pixels along said common scan line,
    each of said plurality of modulators having the same pixel clock time between successive pixels along said common scan line;

a plurality of laser drivers configured to generate a laser driver signal from said plurality of the modulated control signals;

a light beam generating unit configured to generate a light beam being driven by said plurality of laser drivers, wherein each of said plurality of laser drivers is coupled to a corresponding one of said plurality of modulators so as to generate a laser driver signal from a corresponding modulated signal, and wherein said plurality of laser drivers are electrically coupled to said light beam generating unit such that said light beam is driven by said laser driver signals.

2. The light beam scanning apparatus according to claim 1, wherein said plurality of modulators comprise pulse width modulators (PWMs).

3. The light beam scanning apparatus according to claim 1, wherein said plurality of modulators comprise a first modulator configured to output a first modulated signal for odd successive pixel image data on said common scan line and a second modulator configured to output a second modulated signal for even successive pixel image data on said common scan line.

4. The light beam scanning apparatus according to claim 3, wherein a center of even and odd pixels is aligned by said light beam generating unit.

5. The light beam scanning apparatus according to claim 3, wherein the first modulator is synchronized with a reference clock, and wherein the second modulator is synchronized with the reference clock.

6. The light beam scanning apparatus according to claim 1, further comprising:

a combiner coupled to said plurality of modulators so as to receive the modulated signals outputted by said plurality of modulators, said combiner outputting a combined modulated signal;

wherein said plurality of laser drivers are coupled to said combiner so as to generate said laser driver signal from said combined modulated signal.

7. The light beam scanning apparatus according to claim 6, wherein said combiner comprises an OR gate circuit.

8. The light beam scanning apparatus according to claim 1, wherein said light beam generating unit comprises a single laser.

9. An image forming device including the light beam scanning apparatus according to claim 1.

10. The image forming device according to claim 9, wherein the image forming device comprises one of a laser printer, a photocopier, a facsimile machine, or a combination thereof.

11. The light beam scanning apparatus according to claim 1, wherein the common scan line is a series of pixels along the main scanning direction of an object to be scanned.

12. The light beam scanning apparatus according to claim 1, wherein the plurality of control signals are generated by the image processor by parallel processing.

13. A light beam scanning apparatus comprising:

a light beam generating unit configured to generate a light beam;

at least two modulators configured to modulate said light beam, said at least two modulators outputting a modulated signal including image data for a common scan line in a main scanning direction; and at least one image processor configured to transfer said image data to said at least two modulators, wherein said at least two modulators comprise a first modulator configured to output a modulated signal for odd pixel image data and a second modulator configured to output a modulated signal for even pixel image data, wherein the first modulator is synchronized with a reference clock, and wherein the second modulator is synchronized with a delayed reference clock.

14. A method of scanning a common scan line in a main scanning directing with a light emitting device, comprising:

generating at least a first control signal and a second control signal for driving the light emitting device, said first control signal and said second control signal being generated from image data for the common scan line in the main scanning direction;

driving the light emitting device with the first control signal to scan the common scan line in the main scanning direction;

driving the light emitting device with the second control signal to scan the common scan line in the main scanning direction; and synchronizing the second control signal with a delayed clock, the delayed clock being delayed with respect to the first control signal.

15. An image forming device, comprising:

means for emitting a light beam;

means for driving said means for emitting a light beam so as to scan successive pixels along a common scan line in a main scanning direction; and means for modulating said light beam with a plurality of modulated signals including image data for each of the successive pixels along the common scan line in the main scanning direction, wherein said means for driving comprises a plurality of laser drivers, each of said plurality of laser drivers generating a laser driver signal from a corresponding modulated signal, and wherein the image forming device further comprises means for combining said laser driver signals.

16. The image forming device according to claim 15, wherein the common scan line is a series of pixels along the main scanning direction of an object to be scanned.

* * * * *